Jan. 27, 1925.

G. SEIBT ET AL 1,524,370

DRIVING MOTOR FOR TALKING MACHINES, DICTATING MACHINES, AND THE LIKE

Filed Nov. 17, 1923

Inventors
G. Seibt
G. Schernbeck
By Marks & Clerk
Attys.

Patented Jan. 27, 1925.

1,524,370

UNITED STATES PATENT OFFICE.

GEORG SEIBT, OF BERLIN-SCHONEBERG, AND GEORG SCHERNBECK, OF BERLIN-TEMPELHOF, GERMANY.

DRIVING MOTOR FOR TALKING MACHINES, DICTATING MACHINES, AND THE LIKE.

Application filed November 17, 1923. Serial No. 675,308.

*To all whom it may concern:*

Be it known that we, Dr. GEORG SEIBT, a German citizen, residing at Hauptstrasse 9, Berlin-Schoneberg, Germany, and GEORG SCHERNBECK, a German citizen, residing at Ordensmeisterstrasse 4, Berlin-Tempelhof, Germany, have invented certain new and useful Improvements in and Relating to Driving Motors for Talking Machines, Dictating Machines, and the like, of which the following is a specification.

This invention relates to an improved driving motor for talking machines, dictating machines and the like.

A driving motor for talking machines, dictating machines and the like should fulfil the following requirements.—run noiselessly; be capable of running at a slow speed so that the disc or the like may be driven direct by the motor shaft; it should be capable of being driven by continuous or by alternating currents, as may be required, and of being connected directly on to the existing supply circuit, of either continuous current or of alternating current and of 110 or 220 volts through the intermediary of a suitable series resistance; further, the motor should have a torque as constant as possible, its construction should be simple, and no expensive materials such as alloyed metal sheets and silk-covered copper wires, should be used therein; finally the dimensions of the motor, its weight and its cost of manufacture should be small.

Small and cheap high speed driving motors for talking machines and the like which drive the disc or its equivalent through the intermediary of a gear with a high ratio of transformation are known. The main drawback of this mode of driving is that the motor does not work noiselessly. Owing to the high speed of the motor, it is impossible to remove the noise, although the same may be reduced to a certain extent by a more expensive form of construction, more particularly by constructing the motor very accurately.

Slow speed electro-motors of ordinary construction with two or four poles have also been used for the direct drive of talking machines or the like. These motors are very heavy and expensive; moreover they do not give a uniform torque if the number of slots containing the windings is not sufficiently large. The use of more than four poles is hardly possible for such small motors and, as is well known, a small number of poles has the disadvantage that the armature carries a comparatively large amount of unutilized copper.

The motor constructed according to the present invention mainly differs from the usual form of construction in this that, as compared with the single or comparatively few large magnetic circuits which number depends on the number of poles, it is provided with a large number of small magnetic circuits. With such small magnetic circuits it is possible to make the sections of the iron of exactly the same size and keep them very small so that the use of laminations may be dispensed with also in the case of alternating current. As the sections of the iron are made of exactly the same size, all the iron in the apparatus is effective. Morever, by this arrangement the copper winding can be distributed more favourably, inactive copper (for instance heads of the armature winding) being entirely avoided. Every portion of the iron and of the copper winding contributes towards the building up of the torque.

The invention is illustrated diagrammatically and by way of example in the accompanying drawings, in which, Figure 1 is a sectional elevation of the motor.

Figure 3:
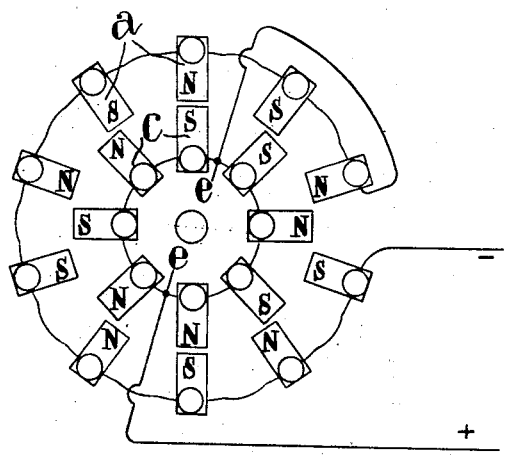
Figure 3 is a diagram showing the arrangement of the poles and of the connections of the windings thereon for both constructions.

The stator consists of an even number of at least eight, preferably ten, small horseshoe electro-magnets $a$ which are arranged in a circle. The poles, of each one of these horseshoe electro-magnets are directed inwards (see Figures 1 and 2) and lie in an axial plane of the stator. The electro-magnets $a$ are connected in such a manner that a north and a south pole N and S respectively, follow each other in succession (see Fig. 3). The coils $b$ on the electromagnets $a$ may be connected in parallel or in series with one another.

Figure 5:
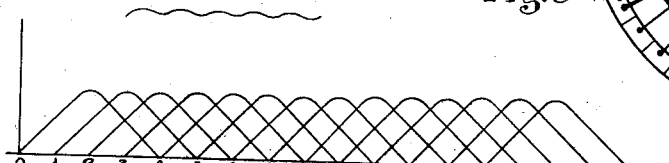
Figure 5 is a diagram of the partial torques and of the total torque of the machine.

The rotor is provided with an even number of horseshoe electromagnets $c$ of exactly the same size as the electromagnets $a$ of the stator, their number being smaller than that of the latter electromagnets, preferably eight, and their poles being directed outwards and lying in an axial plane. The coils $d$ of the electromagnets $c$ which together form a short-circuited winding, are connected in series with one another in such a manner that magnet poles of opposite polarity N and S lie next to one another except at the points of connection $e$ with the leading-in wires (see Fig. 3) where the poles of the two adjacent electromagnets are of the same polarity. Moreover, the connections are such that each magnet pole of the rotor as it passes past a pole of the stator, is of opposite polarity to that of the latter pole. The commutator $f$ is electrically connected in such a manner that the leading-in wires $g$ (see Fig. 3) travel from coil to coil in an opposite direction to the direction of rotation, which has the effect that a rotor magnet is always reversed when it lies exactly opposite a stator magnet, so that if it has previously been attracted, it will now be repulsed. In a motor having the number of poles hereinbefore indicated and a commutator with 40 segments, the operation just referred to will take place forty times per revolution, in consequence of which, the torque produced is very uniform, as is diagrammatically shown in Fig. 5.

Owing to the small internal resistance of the comparatively small number of turns, the motor requires only a small voltage, so that also the potential difference between the commutator segments is very small, approximately three volts. When the motor is running idle, its speed is about 600 revolutions per minute. By providing a suitable speed regulator the disc cylinder or the like may be mounted direct on the axle of the motor.

Figure 1:
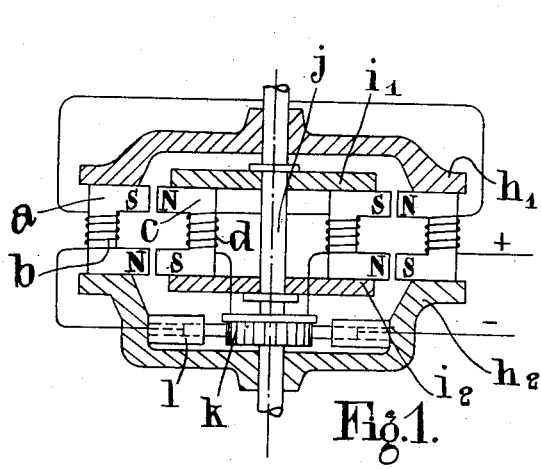
Figure 2:
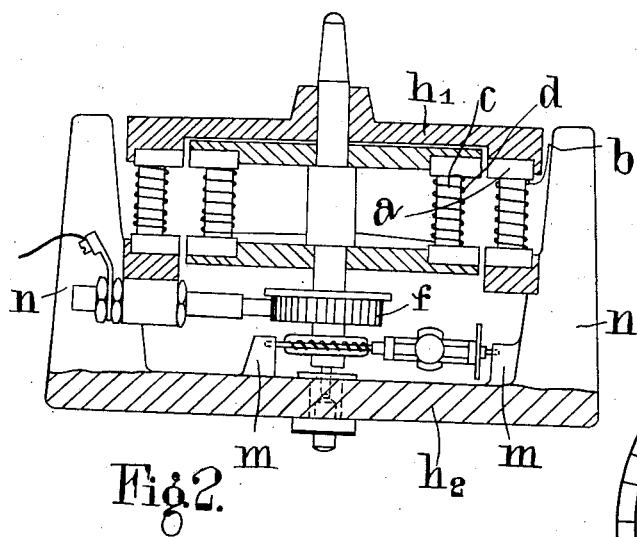
Figure 2 shows in sectional elevation a modified form of construction of the motor.
Figure 4:
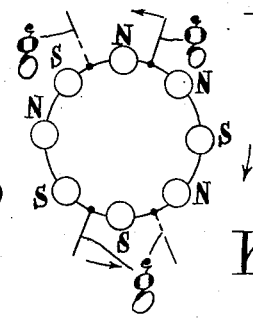
Figure 4 is a diagram of connections of the armature.
Figure 6:
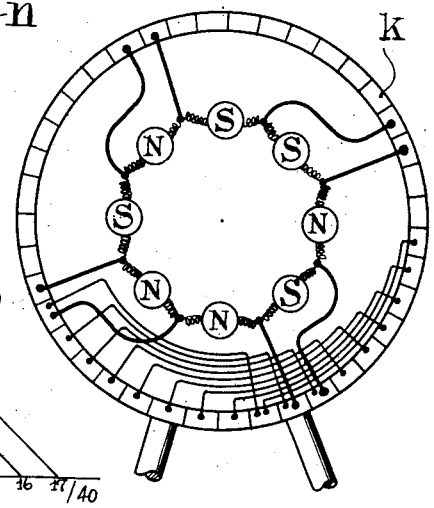
Figure 6 is a diagram illustrating the connections between the commutator and the rotor coils of the motor.

The mechanical construction of the motor is of a very simple character. For the winding, use may be made of varnished wire. Referring more particularly to Figure 1, the motor comprises only two end shields $h_1$, $h_2$ of non-magnetic material, for instance aluminum, between which shields are mounted the field magnets $a$. Two discs of aluminum or the like $i_1$ $i_2$ are mounted on the rotor axle $j$, between which discs are secured the armature magnets $c$. The motor also comprises the commutator $k$, the brush holder $l$ and a speed regulator which is of known construction (not shown).

Experiments have shown that motors which are intended to be operated not only by continuous current but also with alternating current, must not be made too light, as otherwise they vibrate and are noisy. It has been found that these vibrations can be damped either by constructing the motor so as to possess a very heavy weight or by suitably connecting it with a very heavy weight. This may be carried into effect by constructing one of the two end shields referred to in connection with Figure 1 in such a manner that it possesses the desired weight. This feature of the invention has been embodied in the form of construction illustrated in Figure 2. As will be seen, the lower end shield $h_2$ has been made of substantial size, the material used being cast iron, in order to keep the price as low as possible. The bearings $m$ for the speed regulator are cast with the shield $h_2$ in order that the regulator may be mounted directly thereon. Moreover, the shield is provided with three upwardly directed columns $n$ to which the stator of the motor is secured, and which also serve for attaching the apparatus to the cover of the gramophone box. As the shield $h_2$ is made of large size and consequently is very heavy, it will vibrate but very little so that the motor will run practically noiselessly. It is to be understood that if desired also the upper shield $h_1$ may be constructed in the same manner as the lower shield $h_2$.

What we claim is:—

1. A driving motor for talking machines, dictating machines and the like having a stator, a rotor, a commutator and brushes thereon, the stator comprising an even number of at least eight small horseshoe electromagnets arranged in a circle, the two poles of each magnet being directed inwards and lying in an axial plane of the stator, the windings of the electromagnets being interconnected in such a manner that a north and a south pole alternate with each other, and the rotor comprising an even number of horseshoe electromagnets which number is slightly smaller than that of the electromagnets of the stator, the poles of the rotor electromagnets being directed outwards and lying in an axial plane and their coils forming together a short-circuited winding and being connected to the commutator in such a manner that the current led thereto through the brushes of the commutator flows through them in such a manner that at all points poles of opposite polarity alternate with each other except at the points where the current enters the rotor where the poles of the adjacent electromagnets are of the same polarity, as and for the purpose set forth.

2. A driving motor for talking machines, dictating machines and the like as claimed in claim 1, having ten electromagnets on the stator and eight on the rotor, as set forth.

3. A driving motor for talking machines, dictating machines and the like as claimed in claim 1, having two end shields of which one is made of heavy weight, as and for the purpose set forth.

4. A driving motor for talking machines, dictating machines and the like as claimed in claim 1 having two end shields of which one is made of heavy weight and columns on the said end shield of heavy weight, as and for the purposes set forth.

In testimony whereof we have signed our names to this specification.

GEORG SEIBT.
GEORG SCHERNBECK.